(12) United States Patent
White et al.

(10) Patent No.: US 11,555,956 B2
(45) Date of Patent: Jan. 17, 2023

(54) POLYMER OPTICAL FIBER WITH TUNABLE, HYDROLYTICALLY STABLE OVERCLADDING

(71) Applicant: Chromis Fiberoptics, Inc., Warren, NJ (US)

(72) Inventors: Whitney Ryan White, Watchung, NJ (US); Nazi Faisal Chowdhury, Edison, NJ (US); Gabor Kiss, Hackettstown, NJ (US)

(73) Assignee: CHROMIS FIBEROPTICS, INC., Warren, NJ (US)

( * ) Notice: Subject to any disclaimer, the term of this patent is extended or adjusted under 35 U.S.C. 154(b) by 401 days.

(21) Appl. No.: 16/908,992

(22) Filed: Jun. 23, 2020

(65) Prior Publication Data

US 2021/0271018 A1   Sep. 2, 2021

Related U.S. Application Data

(60) Provisional application No. 62/982,827, filed on Feb. 28, 2020.

(51) Int. Cl.
| | |
|---|---|
| *G02B 6/02* | (2006.01) |
| *B29D 11/00* | (2006.01) |
| *B29C 48/05* | (2019.01) |
| *B29C 48/21* | (2019.01) |
| *B29K 71/00* | (2006.01) |
| *B29K 23/00* | (2006.01) |

(52) U.S. Cl.
CPC .......... *G02B 6/02038* (2013.01); *B29C 48/05* (2019.02); *B29C 48/21* (2019.02); *B29D 11/00682* (2013.01); *B29K 2023/38* (2013.01); *B29K 2071/00* (2013.01); *B29K 2995/0031* (2013.01); *B29K 2995/0039* (2013.01)

(58) Field of Classification Search
CPC ...... B29C 48/05; B29C 48/21; G02B 6/02038
See application file for complete search history.

(56) References Cited

U.S. PATENT DOCUMENTS

| | | |
|---|---|---|
| 6,677,175 B2 | 1/2004 | Zhao et al. |
| 7,236,675 B2 | 6/2007 | Naitou et al. |
| 8,509,577 B2 | 8/2013 | Liu |
| 8,798,423 B2 | 8/2014 | Sillard et al. |
| 8,917,962 B1 | 12/2014 | Nichol |

OTHER PUBLICATIONS

International Search Report and Written Opinion in co-pending, related PCT Application No. PCT/US2021-018654 dated Apr. 29, 2021.

*Primary Examiner* — James Sanders
(74) *Attorney, Agent, or Firm* — Thomas | Horstemeyer, LLP

(57) ABSTRACT

A polymer optical fiber is provided which shows improved hydrolytic stability. This fiber comprises a polymeric optical core and cladding layer, surrounded by a polymeric overcladding layer which comprises a miscible blend of one or more hydrolytically stable amorphous polymers. By varying the ratios of the component polymers in the overcladding blend, the glass transition temperature and the coefficient of thermal expansion of the overcladding layer may be tuned to optimize the attenuation and bandwidth of the plastic optical fiber.

14 Claims, 3 Drawing Sheets

POLYMER OPTICAL FIBER WITH TUNABLE, HYDROLYTICALLY STABLE OVERCLADDING

CLAIM OF PRIORITY

This application claims priority to and the benefit of provisional application No. 62/982,827, filed Feb. 28, 2020, entitled "POLYMER OPTICAL FIBER WITH TUNABLE, HYDROLYTICALLY STABLE OVERCLADDING", which is entirely incorporated herein by reference.

FIELD OF INVENTION

The field of the disclosure relates to polymer optical fibers.

BACKGROUND OF INVENTION

In the field of optical communication, optical fibers composed entirely of polymeric materials have sometimes been preferred over more conventional silica-based fibers in short distance applications. While silica-based optical fibers typically have superior optical transparency, plastic optical fibers (POF) sometimes offer improved durability as a result of their unique mechanical properties and lower installed costs due to their ease of termination and attachment to active devices, including lasers and photodetectors. As demands for higher bandwidth data transmission and improved durability have arisen, many innovations have been developed to improve the performance of POF.

The development of POF technology began with a simple step-index design, typically comprising a hydrocarbon polymer core (often polymethyl methacrylate, PMMA), with a lower-index cladding layer, usually a partially fluorinated acrylate polymer. [See, for example, U.S. Pat. No. 3,641,332 to Reick et al]. Later improvements included the use of deuterated acrylate materials to reduce optical absorption [see for example, U.S. Pat. No. 4,138,194 to Beasley et al]. Later, Ohtsuka et al developed a much higher-bandwidth POF, by using a small-molecule index-raising dopant and a novel interfacial gel polymerization process to produce a graded refractive index inside a PMMA fiber. [See, for example, U.S. Pat. No. 5,541,247 to Koike et al]. While PMMA-based graded-index POF possessed greatly improved bandwidth, it still suffered from high optical attenuation, especially at the near-infrared wavelengths typically used by commercial high-speed communication lasers.

Kaino et al [in *Review of the Elec. Comm. Lab.*, v. 32, p. 478 (1984)] showed that optical absorption by carbon-hydrogen bonds contributed heavily to optical attenuation in PMMA-based fibers, and that replacing the hydrogen atoms with heavier deuterium isotopes could greatly reduce optical attenuation at visible and near-infrared wavelengths. In the 1990's, Y. Koike and coworkers showed that a qualitative reduction in optical attenuation could also be used by using an amorphous perfluorinated polymer for the optical core and cladding. [See, for example, *Polymer Journal*, vol. 32 p. 43 (2000)]. By combining this advance with the use of a perfluorinated small-molecule dopant to form a graded-index core, it was possible to fabricate a POF with the bandwidth and optical transparency required to perform multigigabit-per-second transmission over tens or hundreds of meters using commercially practical lasers and photodetectors. [See, for example, Polley et al, *IEEE Photonics Technology Letters*, v. 19, p. 1254 (2007)].

In order to produce POFs with different properties, such as numerical aperture or operating temperature, it is often advantageous to use optical core and/or cladding materials with are copolymers of different monomers. [See, for example, U.S. Pat. No. 6,750,294 to Sugiyama et al]. In many cases, this allows the fiber designer to optimize the properties of the core and cladding polymers, such as refractive index and glass transition temperature, merely by changing the ratio of the comonomers without changing the basic chemistry of the polymer.

Because amorphous perfluorinated polymers are extremely costly, perfluorinated POF must adopt fiber constructions that minimize the use of these materials. While the optical core and cladding for multigigabit-per-second optical fibers are typically only 50-100 μm in diameter, the overall fiber diameter must be considerably larger overall diameter (usually at least 250-500 μm) in order to have acceptable tensile properties for easy handling. Thus, a new POF structure 100 (e.g., 100), illustrated in FIG. 1, was introduced for perfluorinated POF, comprising three layers: an innermost optical core layer 103 (with either step or graded refractive index), surrounded by an optical cladding layer 106, with an outermost, overcladding layer 109 to provide mechanical strength. [see for example. Nakao et al, Journal of Lightwave Technology, v. 30, p. 969 (2012)] Other improvements included multiple optical cladding layer and other improvements of the refractive index profile intended to minimize bending losses while minimizing adverse effects on bandwidth. [See, for example U.S. Pat. No. 6,750,294 to Sugiyama et al] Also, extrusion-based production methods for these POF structures were introduced, allowing continuous production of graded-index perfluorinated POF without the use of preform-based drawing methods. [See, for example, U.S. Pat. Nos. 6,527,986 and 6,254,808 to Blyler et. al.]

While the overcladding layer does not guide light, there are many constraints on its properties for high-performance POF. First the overcladding material must be very homogeneous, so that it can be co-extruded with the optical layers of the fiber, while maintaining very stringent control of overall diameter and layer-to-layer concentricity of the fiber. Especially, the thermal expansion properties of the overcladding material must be closely matched to those of the optical layers, in order to prevent high attenuation from microbending. [See, for example, Gardner et al, *Topical Meeting on Optical Fiber Transmission*, Williamsburg, Va. (1975)] Another approach to minimize added optical attenuation resulting from the overcladding layer is to increase the fiber numerical aperture and thereby improve the resistance of the optical layers to mechanical distortion.

The prior art includes POF structures using, among others, PMMA, polycarbonates, cyclic olefin polymers, and other glassy homopolymers as overcladding layers. In each of these cases, only a relatively narrow range of thermal expansion properties is available. Consequently, they can only be used with core and cladding polymers having a relatively narrow range of thermal expansion and glass transition temperatures.

This represents a significant problem for developing POFs with copolymeric core and/or cladding materials, since the glass transition temperature and the thermal expansion properties of the copolymer typically change considerably over the range of compositions that are of interest. Therefore, the development of POFs having copolymeric core and/or cladding layers would be considerably simplified by having a polymer blend system with tunable glass transition temperature and thermal expansion properties. Also, if such a blended overcladding material had good hydrolytic stability it would be attractive for many POF applications requiring long-term stability in hot and humid environments.

There are numerous literature examples of miscible blends of amorphous polymers. Notable examples include blends of polystyrene and poly(2,6-dimethyl-1,4-phenylene oxide) (PPO) [see, for example, Yu M. Boiko, Mechanics of Composite Materials, vol. 36, No. 1, 2000], as well as blends of polystyrene with poly(o-chlorostyrene), poly (α-methyl styrene), and poly(vinyl methyl ether). [See, for example Cameron T. Murray, "Neutron Scattering Investigations of Miscible Polymer Blends", (1985), *Doctoral Dissertations* 1896-2014]. Miscible polymer blends incorporating one or more amorphous cyclic olefin polymers have also been documented. [See, for example, U.S. Pat. No. 6,767,966 to Berger et al]

Finally, a particularly interesting blend has been documented of two amorphous cyclic olefin copolymers, sold commercially as Zeonex® 5000 and Zeonex® 480R. This binary polymer blend has been shown to be miscible over the entire range of compositions, providing a homogeneous, amorphous polymer blend with glass temperatures ranging from 68° C. to 138° C. This polymer blend is also particularly attractive as a POF overcladding material, as both components are known to demonstrate excellent hydrolytic stability.

Although hydrolytically stable polymer blends have been demonstrated, there has not yet been provided a polymer optical fiber using such blends to form a tunable, optionally hydrolytically stable overcladding layer.

SUMMARY

According to this disclosure, there is now provided a polymer optical fiber having an overcladding layer formed from a blend of two or more polymers, and which form an amorphous miscible polymer blend with a glass transition temperature and coefficient of thermal expansion which vary over the range of miscible blend compositions. There is also provided a process for producing such polymer optical fibers.

The polymer blends used for the overcladding layer are selected from a list including, but not limited to:

Polystyrene-poly(phenylene oxide)

Polystyrene-poly(o-chlorostyrene)

Poly (ethylene terephthalate)-poly (butylene terephthalate)

poly(methyl methacrylate)-poly(styrene-co-acrylonitrile)

Blends of miscible cyclic olefin copolymers, including blends of Zeonex 5000 and Zeonex 480 or 480R.

In one simple embodiment, the disclosure is a polymer optical fiber comprising of at least three layers: (a) a light-guiding core layer, which comprises an amorphous polymer material (optionally, with a refractive index raising dopant) which has a relatively higher refractive index. The refractive index structure inside the core layer may be either uniform (as in a step-index fiber), or graded. (b) a cladding layer, which comprises an amorphous polymer material (with or without an index-adjusting dopant), which has a refractive index lower than that of the core material. (c) an outermost overcladding polymer layer comprising an amorphous, miscible blend of polymers.

In another embodiment, a process is provided for producing polymer optical fibers of the present disclosure, comprising:

a) Blending the overcladding polymers, using a twin-screw extruder or other means known to those skilled in the art.

b) Pelletizing the blended extrudate from step a.) to form a pelletized overcladding polymer blend c) Co-extruding an optical core polymer material and an optical cladding polymer material, to form a coaxial flow of core polymer inside the cladding polymer d) Optionally, allowing the core and cladding polymer to flow through a heated diffusion section to form a graded refractive index e) Producing a stream of overcladding polymer by means of a screw extruder or other extrusion methods known in the art f) Joining the coaxial core and cladding polymer streams with the overcladding polymer stream at a coextrusion crosshead, to form a three-layer coaxial polymer stream with the core stream at the center, and the overcladding stream on periphery g) Extruding the three-layer polymer stream through a die and drawing down the material as it cools to form a polymer optical fiber This summary of the disclosure introduces some of the embodiments of the disclosure, and is not intended to be limiting. Additional embodiments including variations and alternative configurations of the disclosure are further described in the detailed description of the disclosure and examples.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. In addition, use of "a" or "an" are employed to describe elements and components described herein. This is done merely for convenience and to give a general sense of the scope of the disclosure. This description should be read to include one or at least one and the singular also includes the plural unless it is obvious that it is meant otherwise.

The term "polymer" as used herein generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic and atactic symmetries.

The term "perfluorinated" as used herein means that at least 90 mol % of the available hydrogen bonded to carbon have been replaced by fluorine.

All percentages herein are by weight unless otherwise stated.

Figure 1:
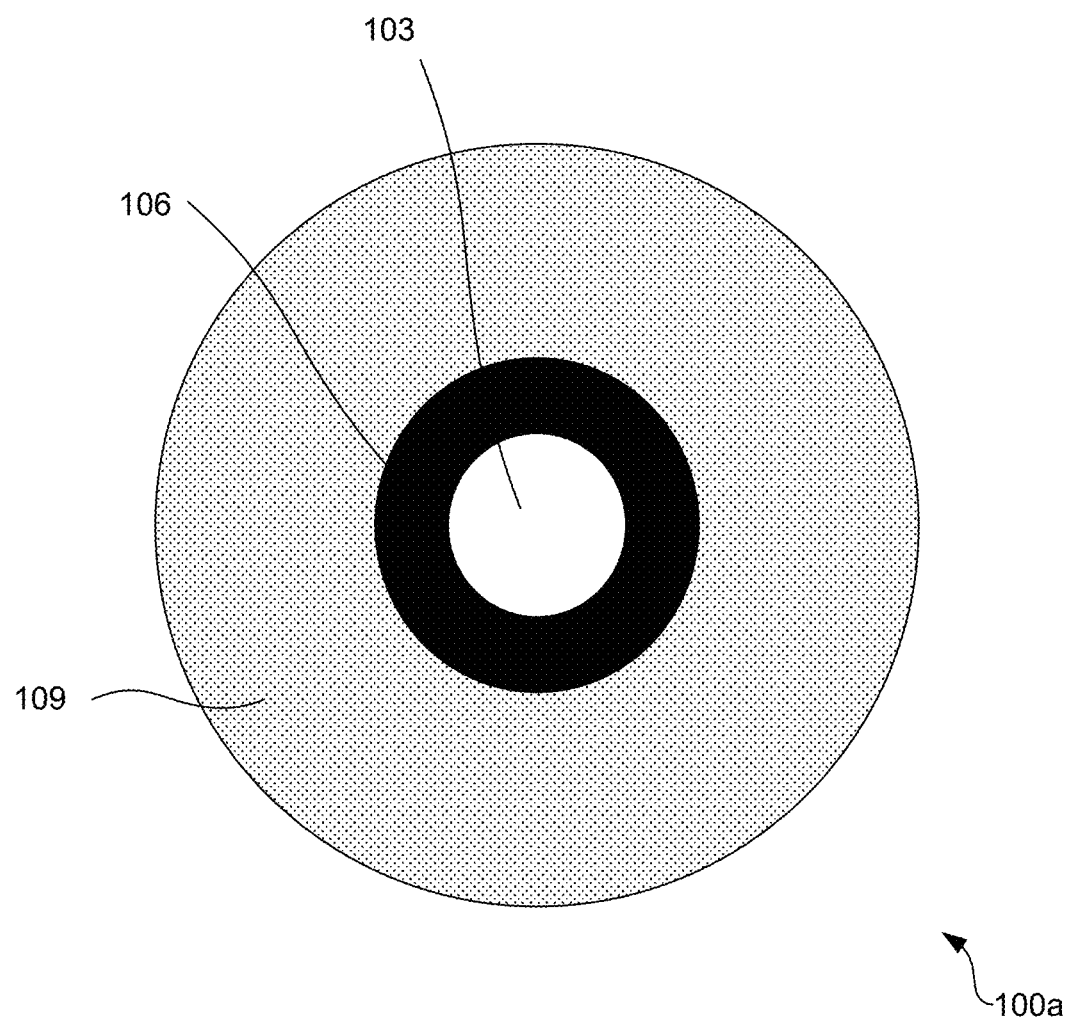
FIG. 1 is an example of a cross-section of a polymer optical fiber with overcladding, in accordance with various embodiments of the present disclosure.
Figure 2:
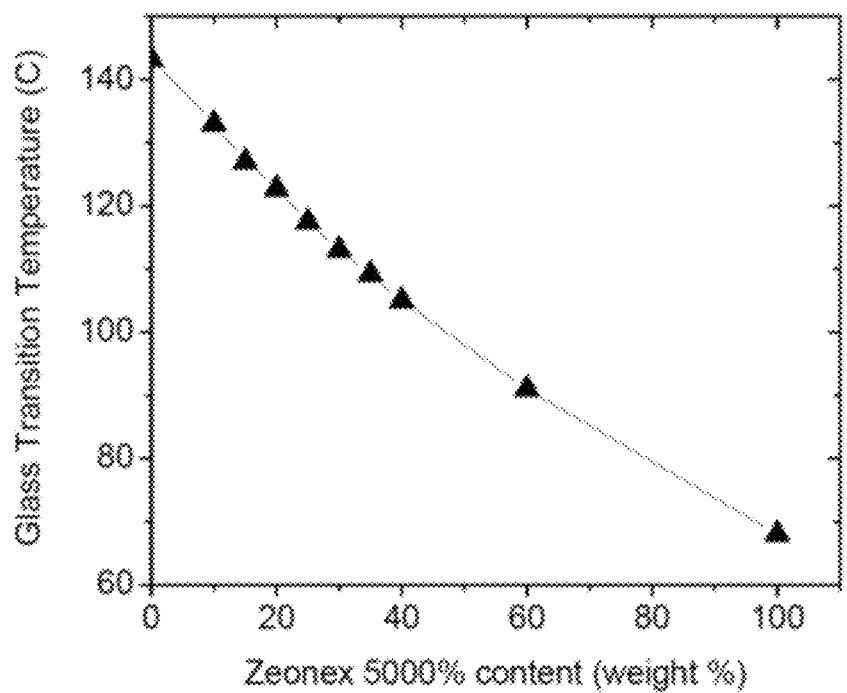
FIG. 2 illustrates a graphical representation of glass transition temperature for miscible blends of Zeonex 5000 and Zeonex 480, in accordance with various embodiments of the present disclosure.

The disclosure relates to a polymer optical fiber 100 (see FIG. 1) having an overcladding layer 109 formed from a blend of two or more polymers, and which form an amorphous miscible polymer blend with a glass transition temperature and coefficient of thermal expansion which vary over the range of miscible blend compositions. There is also provided a process for producing such polymer optical fibers.

The polymer blends used for the overcladding layer 109 are selected from a list including, but not limited to:
Polystyrene-poly(phenylene oxide)
Polystyrene-poly(o-chlorostyrene)
Poly (ethylene terephthalate)-poly (butylene terephthalate)
poly(methyl methacrylate)-poly(styrene-co-acrylonitrile)

Also, many blends of cyclic olefin polymers and copolymers are possible. These include blends of two or amorphous cyclic olefin polymers (for example, Zeonex® 5000 and Zeonex® 480), as well as blends of cyclic olefins and olefinic elastomers (see, for example, Khonakdar et al, *Composites Part B: Engineering*, vol. 69, p. 111, 2015). Numerous blends of various grades of commercially available cyclic olefin polymers may be made between products sold under trade names including Zeonor®, Zeonex®, Topas®, Apel®, and Arton®. Many of these blends also show a high degree of hydrolytic stability, which is preferred for use in polymer optical fibers deployed in hot and humid environments.

The polymer blends of the present disclosure may be prepared by many well-known methods. In principle, they may be blended in mutually compatible solvents, and then the solvent may be evaporated by drying. Practically, this approach is typically not preferred due to the need for evaporate and recover the solvent.

More commonly, such blends are prepared by first mechanically mixing pellets or powders of the constituent polymers using a stirring mixer or a V-blender. Then the mixture of polymers is typically fed into a mixing extruder and the components become intimately intermixed in the melt phase during passage through the extruder barrel. Many types of extruders are suitable for undertaking the mixing process, including twin screw extruders, and single-screw extruders with specialized mixing screws. Solution-based mixing methods may also be employed with devolatilizing extruders.

After mixing inside the extruder, the overcladding polymer blend may be extruded from a die and pelletized using standard methods and equipment. The resulting pelletized blend may then be stored for later use in the fiber extrusion process. Alternatively, the mixing extruder may be incorporated into the fiber extrusion process shown in FIG. 3, delivering the blended overcladding polymer as a melt directly to the lower crosshead of the plastic optical fiber extrusion line.

In one simple embodiment, the disclosure is a polymer optical fiber 100 comprising at least three layers: (a) a light-guiding core layer 103 comprising an amorphous polymer material (optionally, with a refractive index raising dopant) which has a relatively higher refractive index. The refractive index structure inside the core layer may be either uniform (as in a step-index fiber), or graded. (b) a cladding layer 106, which comprises an amorphous polymer material (with or without an index-adjusting dopant), which has a refractive index lower than that of the core material. (c) an outermost overcladding polymer layer 109 comprising an amorphous, miscible blend of polymers.

The present disclosure may be practiced with polymer optical fibers 100 having many different optical core and cladding materials, which may be intended for diverse applications. For example, in polymer optical fibers 100 using operating at visible wavelengths with a low data rate in a high-temperature environment, a polycarbonate optical core material may be used without dopant, with a lower-index cladding material, such as a partially fluorinated acrylate, and with an overcladding 109 comprising a relatively high glass transition temperature blend of cyclic olefin copolymers. As another example, a polymer optical fiber 100 intended for use at lower temperatures and at higher data rates might comprise a poly (methyl methacrylate) or polystyrene core and cladding, with a graded refractive index formed in the core by a small-molecule index-raising dopant, and with a poly (ethylene terephthalate)-poly (butylene terephthalate) blend overcladding layer 109.

Since the use of an overcladding layer 109 is most common in POFs using expensive amorphous perfluoropolymers, it is anticipated that the present disclosure may be practiced with these core materials. For example, a high-bandwidth, infrared-transparent, hydrolytically stable POF 100 may be produced by co-extruding an amorphous fluoropolymer core material (such a perfluoro butenyl vinyl ether homopolymer, or poly-PBVE) having a graded refractive index formed with a small-molecule index-raising dopant, surrounded by an undoped poly-PBVE cladding layer, and an overcladding layer formed from a blend of cyclic olefin copolymers. Similar POF structures with similar characteristics may be produced according to the present disclosure, by using other amorphous fluoropolymers including, but not limited to copolymers of perfluoro (dimethyl dioxole) (PDD) or homopolymers and copolymers of perfluorinated dioxolanes. In each case, the composition of the blend overcladding layer 109 may be adjusted to produce optical fiber performance in regard to attenuation and bandwidth, without departing from a single set of constituent starting polymers comprising the blend.

Figure 4:
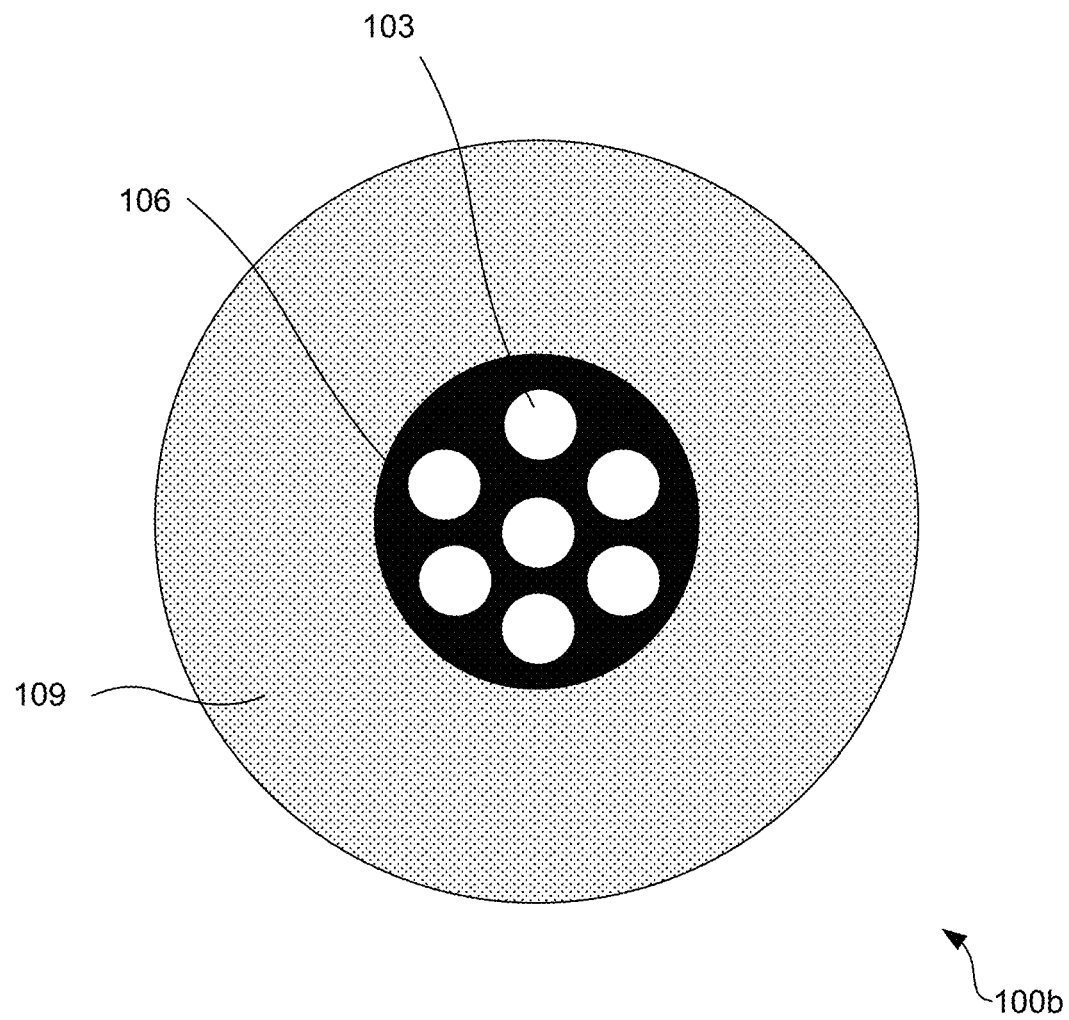
FIG. 4 illustrates an example of a cross section of multicore POF, in accordance with various embodiments of the present disclosure.

Finally, the present disclosure may be used in production of multicore POF 100b, as shown in FIG. 4, wherein two or more optical cores 103 surrounded by lower-index cladding layers 106 are disposed with a "sea" of overcladding material 109.

The present disclosure may be readily adapted to continuous POF extrusion processes, including the processes developed for graded-index POF according to U.S. Pat. Nos. 6,527,986 and 6,254,808 to Blyler et. al. In this process, the polymers comprising the overcladding blend would be blended together, for example by a twin-screw extrusion process, followed by pelletizing of the blended extrudate. Next, a reservoir of optical core polymer would be prepared by mixing a small-molecule index-raising dopant into an amorphous perfluorinated polymer, through a combination of mechanical mixing and diffusion. The resulting doped core material reservoir, as well as a clad material reservoir of undoped amorphous perfluorinated polymer, are then attached to the fiber extrusion system shown in FIG. 3. The reservoirs are degassed by application of vacuum at elevated temperature, and are then heated into the melt state, where pressure is applied to the reservoirs with an inert gas, such as nitrogen.

Figure 3:
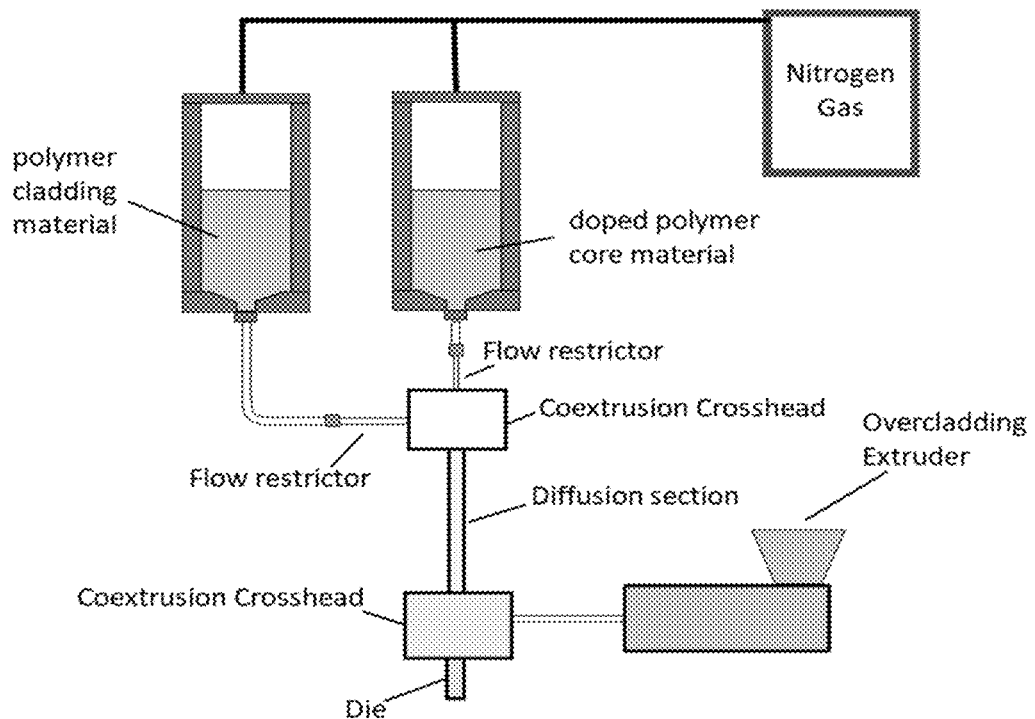
FIG. 3 illustrates an example schematic of a co-extrusion process for plastic optical fibers (POF) with overcladding, in accordance with various embodiments of the present disclosure.

In response to the application of pressure to the reservoirs, the core and cladding materials begin to flow through the connecting tubes in FIG. 3 to the upper crosshead, where they are joined together into a coaxial, cylindrically symmetric flow with the doped core material surrounded by the undoped cladding material. If a graded refractive index structure is desired in the fiber core, then the coaxial flow is sent through a heated diffusion section, wherein the small-molecule dopant diffuses outward from the doped polymer in the center to form graded refractive index.

In the other branch of the POF extrusion system in FIG. 3, the pelletized overcladding blend polymer is fed into a conventional screw extruder, which melts the overcladding blend and pushes it into the lower crosshead. At the lower crosshead, the molten core and cladding polymer stream is joined with the stream of molten overcladding polymer to form a cylindrically symmetric, coaxial three-layer flow, comprising an innermost core layer, surrounded by the cladding layer, and with the blended overcladding layer on the periphery. The resulting three-layer molten material flow is extruded through a die and drawn down during cooling to form a POF strand with the desired outer diameter. Optionally, the outer diameter of the strand may be controlled through a feedback loop comprising a laser scanning diameter gauge and a computer-controlled capstan.

The following specific example illustrate certain embodiments and aspects of the disclosure. These examples are intended to further clarify the disclosure, and are not intended to limit the scope in any way.

Example 1: Preparation of Polymer Blend Overcladding Material

A mixture of Zeonex 480 cyclic olefin copolymer pellets (70% by weight) and Zeonex 5000 cyclic olefin copolymer pellets (30% by weight) was prepared with a V-blender. This mixture was fed by an augur, at a rate of 20 pounds/hour, into a 24 mm co-rotating twin screw extruder (ThermoScientific, model TSE-24), equipped with 10-section screws, each containing three mixing sections. The twin-screw extruder contained 10 barrel temperature control zones, and one die temperature control zone. Barrel zones 1 was cooled with forced air, zones 2-3 were set at 240° C., zones 4-5 were set at 250° C., zones 6-7 were set at 260° C., zones 8-10 were set at 270° C., and the die zone was set at 270 C. The die used was a 3-mm outer diameter×three strand die.

After exiting the extruder die, the strands of extrudate are quenched in a water bath (Bay Plastics, model WBX0606-8-1527), and dried with compressed air flow. The dried strands are then pelletized with a rotor pelletizer (Bay Plastics, model BP50-1511). The glass transition temperature of the pelletized blend was measure by differential scanning calorimetry (TA Instruments model Q2000) to be 113° C.

Example 2: Extrusion of Polymer Optical Fiber

The apparatus of FIG. 3 was used to extrude a polymer optical fiber 100 with the blended overcladding material 109 prepared in Example 1. 1.4 kg of doped polymer core material was prepared by mechanically mixing 1290 grams perfluoro (butenyl vinyl ether) (PBVE) homopolymer with 110 grams of perlfuoro-(1,3,5-triphenyl benzene) dopant at a temperature of 220° C., deposited in a core material reservoir and attached to the extrusion system in FIG. 3. 1.3 kg of PBVE homopolymer was deposited in a cladding reservoir and attached to the extrusion system in FIG. 3. Both reservoirs were then held under vacuum for 16 hours at 90 C in order to remove dissolved gases, and then held at the final extrusion temperatures (170° C. for the core reservoir and 185° C. for the cladding reservoir) for 12 hours to allow consolidation of the material in each reservoir.

Nitrogen gas at a pressure of 250 p.s.i. was applied to both reservoirs, and the flow restrictors attached the material reservoirs were heated (to a temperature of 175° C. on the core side, and 200° C. on the cladding side) to allow the material from both reservoirs to flow through the connecting tubing to the upper coextrusion crosshead, which was maintained at 190° C. At the upper crosshead, the core and cladding melt streams for a single coaxial flow and flow downward through the diffusion section. The diffusion section used was 0.9 meters in length, and was maintained at a temperature of 205° C., causing the small-molecule dopant to diffuse outwards from the core stream, thereby forming a graded refractive index upon reaching the lower crosshead.

The overcladding polymer blend prepared in Example 1 is flood feed to a screw single screw extruder (Randcastle Extrusion Systems, model RCP-0625), with all barrel zones maintained at a temperature of 235° C. The screw extruder is operated in pressure feedback mode in order to maintain a constant overcladding polymer output pressure of 150 p.s.i. The resulting overcladding polymer melt stream is joined at the lower crosshead (maintained at 240° C.) with the core and cladding stream exiting the diffusion section, resulting in a three-layer, cylindrically symmetric flow, with the graded-index core at the center, surround by the cladding layer, with the overcladding layer on the outside. This multilayer stream exits through a 2-mm diameter exit die (maintained at 240° C.), and is drawn down to a final diameter of 400 µm, using a computer controlled capstan, with feedback from a laser-scanning diameter gauge (Beta Lasermike, model 200FI).

The attenuation of the resulting fiber was measured with an optical time domain reflectometer (Luciol Instruments, model v-OTDR) to be 120 dB/km at 850 nm wavelength. The diameter of the optical core 103 was measured (by near-field imaging) to be 95 µm, with a numerical aperture (measured by far field imaging) of 0.162. The diameter of the optical cladding layer 106 was measured by far field imaging to be 121 µm. The outer diameter of the overcladding layer 106 was confirmed to be 400 µm, measured with near field imaging.

The fiber was then subjected to accelerated aging, at a temperature of 80° C., with a relative humidity of 85% for 2000 hours. No measurable change in attenuation or other properties was detected at the completion of the accelerated aging test.

What is claimed is:

1. A polymer optical fiber comprising at least three layers, including:
    (a) a light-guiding core layer comprising a first amorphous polymer material which has a relatively higher first refractive index;
    (b) a cladding layer comprising a second amorphous polymer material, which has a second refractive index lower than the first refractive index of the first amorphous polymer material of the light-guiding core;

(c) an outermost overcladding polymer layer comprising an amorphous, miscible blend of polymers, containing at least 1-99% by weight of a third amorphous polymer, with a complementary weight percentage of one or more other polymers;

where the amorphous, miscible blend of polymers in the overcladding polymer layer comprises a cyclic olefin polymer with a glass transition below 70° C.

2. The polymer optical fiber of claim 1, wherein the first refractive index inside the core layer is uniform, and the fiber is a step-index fiber.

3. The polymer optical fiber of claim 1, wherein the first refractive index is graded, and the fiber is a graded-index fiber.

4. The polymer optical fiber of claim 1, wherein the amorphous, miscible blend of polymers in the overcladding polymer layer comprises at least one cyclic olefin copolymer.

5. The polymer optical fiber of claim 1, wherein the amorphous, miscible blend of polymers in the overcladding polymer layer comprises at least one styrenic copolymer.

6. The polymer optical fiber of claim 1, wherein the amorphous, miscible blend of polymers in the overcladding polymer layer comprises at least one of poly(ethylene terephthalate) or poly(butylene terephthalate).

7. The polymer optical fiber of claim 1, where the core layer comprises an amorphous perfluorinated polymer.

8. The polymer optical fiber of claim 1, where the core layer comprises an amorphous perfluorinated polymer comprising a homopolymer or copolymer of perfluoro butenyl vinyl ether (PBVE), with or without an index raising dopant.

9. The polymer optical fiber of claim 1, where the core layer comprises an amorphous perfluorinated polymer comprising a copolymer of perfluoro dimethyl dioxole (PDD), with or without an index raising dopant.

10. The polymer optical fiber of claim 1, where the core layer comprises an amorphous perfluorinated polymer comprising a homopolymer or copolymer of a perfluorinated dioxolane, with or without an index raising dopant.

11. The polymer optical fiber of claim 1, wherein the first amorphous polymer material comprises a refractive index raising dopant.

12. The polymer optical fiber of claim 1, wherein the second amorphous polymer material comprises an index-adjusting dopant.

13. A process for producing the polymer optical fiber of claim 1, comprising the steps of:

blending the polymers of the outermost overcladding polymer layer;

pelletizing the blended polymers to form a pelletized overcladding polymer blend;

co-extruding an optical core polymer material and an optical cladding polymer material, to form a coaxial flow of the optical core polymer material inside the optical cladding polymer material;

producing a stream of overcladding polymer;

joining coaxial core and cladding polymer streams of the coaxial flow of the optical core polymer material inside the optical cladding polymer material with the stream of overcladding polymer at a coextrusion crosshead, to form a three-layer coaxial polymer stream with the coaxial core stream at the center, and the stream of overcladding polymer on periphery; and extruding the three-layer polymer stream through a die and drawing down the material as it cools to form the polymer optical fiber.

14. The process of claim 13, further comprising allowing the core and cladding polymer to flow through a heated diffusion section to form a graded refractive index.

* * * * *